Jan. 13, 1970     A. G. AHLSTONE     3,489,436
APPARATUS FOR HANGING WELL BORE CASING
Filed Oct. 23, 1965     5 Sheets-Sheet 1

INVENTOR.
ARTHUR G. AHLSTONE
BY
Bernard Kriegel
ATTORNEY.

Jan. 13, 1970  A. G. AHLSTONE  3,489,436
APPARATUS FOR HANGING WELL BORE CASING
Filed Oct. 23, 1965  5 Sheets-Sheet 2

INVENTOR.
ARTHUR G. AHLSTONE
BY Bernard Kriegel
ATTORNEY.

Jan. 13, 1970  A. G. AHLSTONE  3,489,436
APPARATUS FOR HANGING WELL BORE CASING
Filed Oct. 23, 1965  5 Sheets-Sheet 3

INVENTOR.
ARTHUR G. AHLSTONE
By Bernard Kriegel
ATTORNEY.

Jan. 13, 1970 A. G. AHLSTONE 3,489,436
APPARATUS FOR HANGING WELL BORE CASING
Filed Oct. 23, 1965 5 Sheets-Sheet 4

INVENTOR.
ARTHUR G. AHLSTONE
By Bernard Kriegel
ATTORNEY.

Jan. 13, 1970 A. G. AHLSTONE 3,489,436
APPARATUS FOR HANGING WELL BORE CASING
Filed Oct. 23, 1965 5 Sheets-Sheet 5
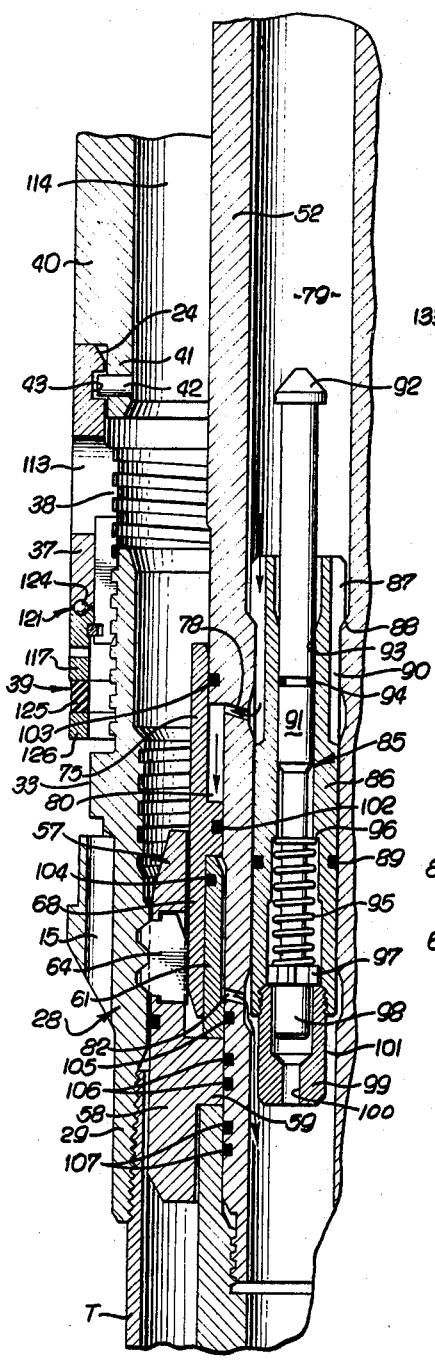
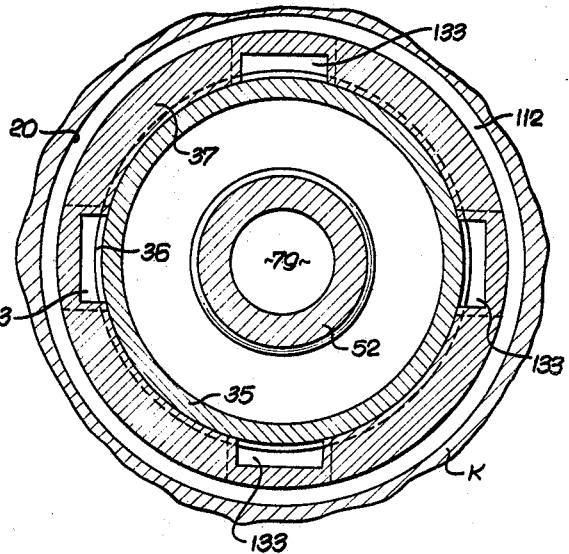
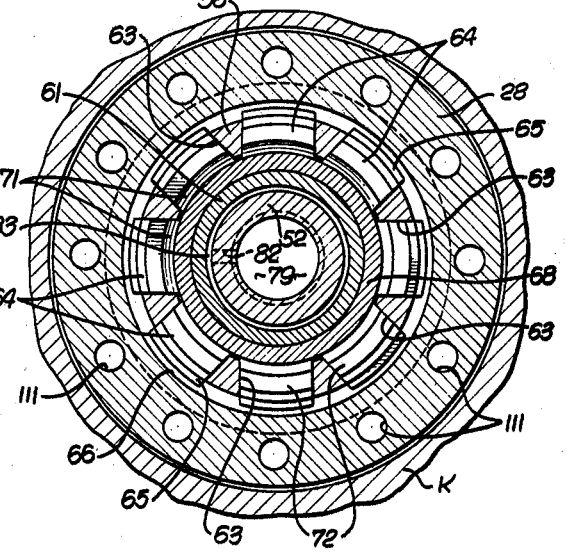
INVENTOR.
ARTHUR G. AHLSTONE
By Bernard Kriegel
ATTORNEY.

United States Patent Office 3,489,436
Patented Jan. 13, 1970

3,489,436
APPARATUS FOR HANGING WELL BORE CASING
Arthur G. Ahlstone, Ventura, Calif., assignor to Ventura Tool Company, Ventura, Calif., a corporation of California
Filed Oct. 23, 1965, Ser. No. 503,047
Int. Cl. F16l 55/00, 33/16; E21b 19/10
U.S. Cl. 285—18                              4 Claims

ABSTRACT OF THE DISCLOSURE

Well bore casing apparatus including an outer hanger body supporting outer casing and an inner hanger body supporting inner casing and movable to a supporting shoulder on the outer body and locked to the latter. A packing structure is shifted into a sealed position to close an annular passage between the bodies. A mandrel connectible to a tubular string is releasably coupled to the inner body by shifting a cylinder on the mandrel, and the inner body and packing structure are lowered as a unit into the outer body, the packing structure being shifted to its sealed position. The cylinder is then shifted along the mandrel to release the mandrel from the inner body.

---

The present invention relates to casing hanger apparatus, and more particularly to apparatus for suspending casing from a well head, performing cementing or other operations in a well bore with respect to the suspended casing, and effecting a pack-off between the suspended casing and the well head.

In the drilling of oil and gas wells at an underwater site, different casing strings are hung to protect strata that have been drilled through from the pressures and fluids which may be required or encountered at greater depths. In many cases, a special housing is provided at or near the ocean bottom to support and seal off a casing string cemented in the well bore. With a drilling rig above water and the special housing below water, there are many problems encountered in suporting a casing string, locking the casing hanger in place, verifying that the lock is operative, circulating fluid for conditioning, cementing the casing string, energizing an annular seal, testing the seal, and installing a protector which protects the seat and sealing area in the housing for the next casing hanger that is used in suspending another casing string to be lowered within the casing string or strings previously installed in the well bore. The problems are accentuated where the drilling rig is on a floating structure anchored in position, but still capable of moving up and down and laterally in various directions.

Heretofore, casing hanger assemblies have required several trips of a running string into the well bore to assemble all necessary parts to one another, and to perform all necessary operations in the running, landing, cementing, sealing and testing in connection with the casing string, and to protect the seat area for the next succeeding casing hanger to be installed in the well bore. A running string, which may be either casing or drill pipe, and a runing tool have been used for lowering the casing hanger body to its seat in a special housing or body at or near the ocean bottom. Fluid can be circulated down through the casing string suspended from the hanger body and up through the annular area thereabout to the annular area above the hanger body to condition the well bore, after which cement is pumped down the running string, through the running tool, and down inside the casing string, the cement returns moving up the annular area between the casing and the drilled hole or previously installed casing string, the returns passing back to the driling rig through the annular area between the running string and the pipe which connects the drilling rig to the well bore. The running string and the running tool are then released from the hanger body and returned to the drilling rig.

With the aid of another running tool and running string, the seal assembly is then lowered to the loctaion of the hanger, and by suitable manipulation of the running string, the seal assembly is installed in place. The running tool may have provision to seal off the bore of the well so that pressure applied above the seal assembly of the casing hanger will indicate if the seal will hold pressure. After the pressure test has been performed, the running string and running tool are brought back or retrieved to the drilling rig.

Another running tool is then used with a runing string to lower a seat protector to the area just above or on the casing hanger just installed, which is the area or region for the next hanger to be seated and sealed. Following installation of the seat protector, the running string and running tool are released therefrom and returned to the drilling rig.

In the performance of the above operations, three round trips with a running string are required, and three different running tools, all at a very high cost, in view of the expense of operating offshore drilling rigs.

The main purpose or objective of the present invention is to reduce considerably the expense of performing the above-noted operations, which have, heretofore, been performed separately, by accomplishing them in a single trip in the well bore. All of the necessary equipment or apparatus is lowered in the well bore on a running string after the parts have all been assembled to one another at the surface, the running tool being assembled hydraulically. The hanger body with the casing suspended therefrom, the packer assembly, and the seat protector are all run in the well bore in a single trip. The hanger body is landed on its companion seat, locked in place, fluid circulated for conditioning the well bore, the casing string cemented in place, the seal provided between the hanger and the previously installed hanger or casing, the effectiveness of the seal tested, and the seat protector installed, in one trip in the well bore, the running string and the running tool being disconnected hydraulically, leaving the assembly in its place, including the installation of the seat protector at its proper location in the previously installed casing hanger.

In effecting the pack-off, the packing element is subjected to compression only, inasmuch as torque or twisting action is not imposed thereon. The hanger body can be locked in place before the circulating and cementing operations commence, so that assurance is had that the hanger cannot be pumped from its companion seat. The sealing effectiveness can be tested before the running tool and running string are elevated from the hole, so that additional pack-off force can be applied, and if the seal is still leaking, the running tool and running string can be removed and a suitable retrieving tool lowered for the purpose of retrieving the packing structure and then lowering a proper packing structure into place to effect a proper seal.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a combined side elevational view and longitudinal section of casing hanger and associated apparatus installed in and in connection with a well bore underlying a body of water;

FIGS. 2a and 2b together constitute a quarter longitudinal section through casing hanger apparatus embodying the invention and landed in a surrounding hanger body or housing, the parts being illustrated in the initial condition they occupy in lowering the apparatus from the drilling rig, FIG. 2b being a lower continuation of FIG. 2a;

FIG. 3 is a cross-section taken along the line 3—3 on FIG. 2a;

Figure 2A:
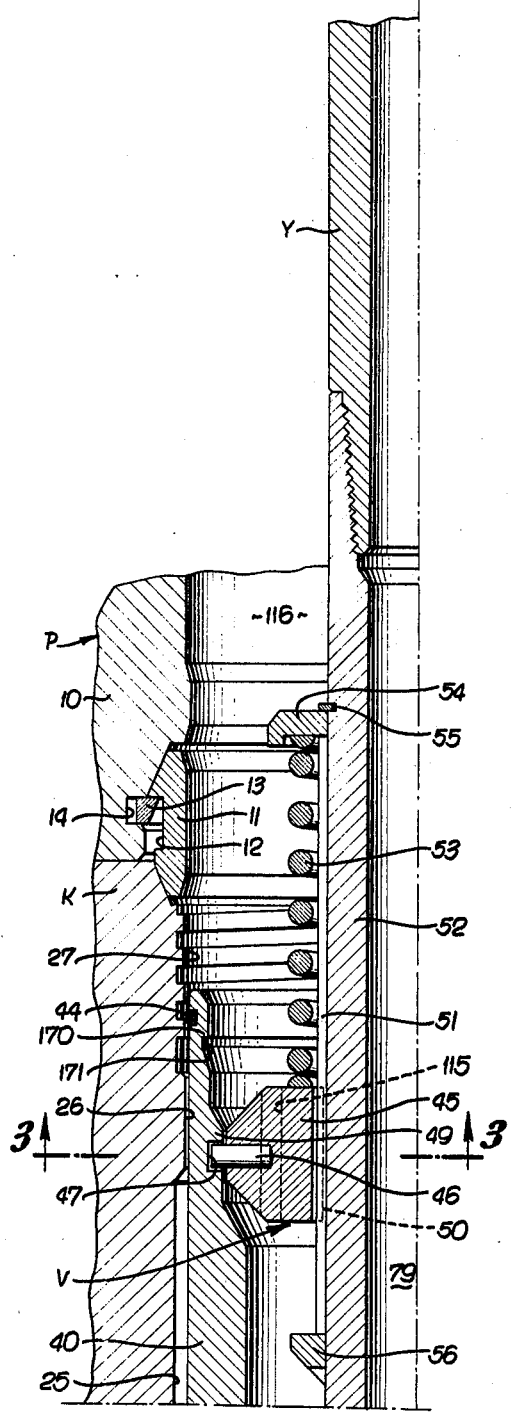
Figure 2B:
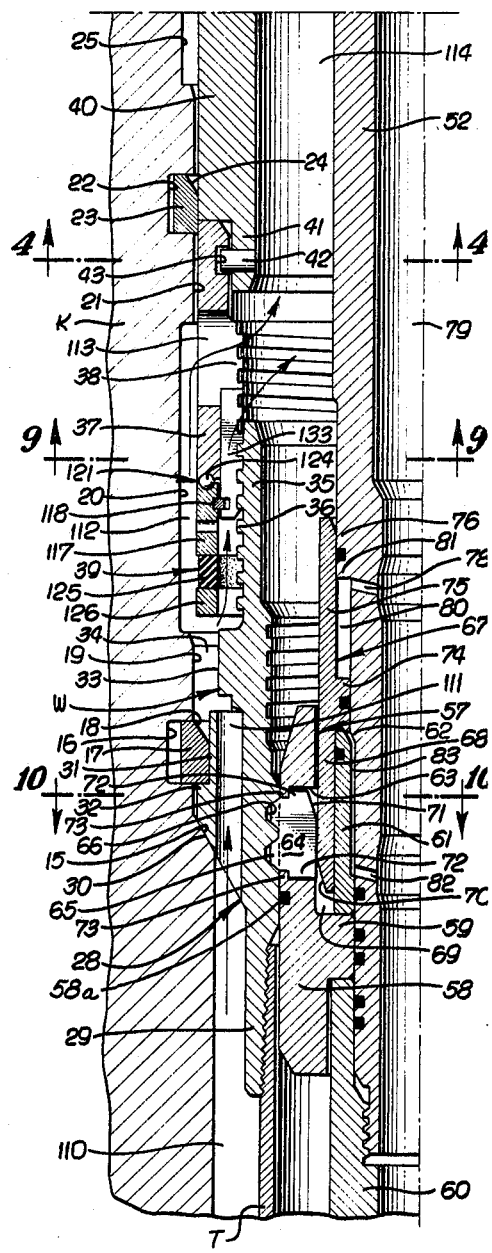
Figure 5A:
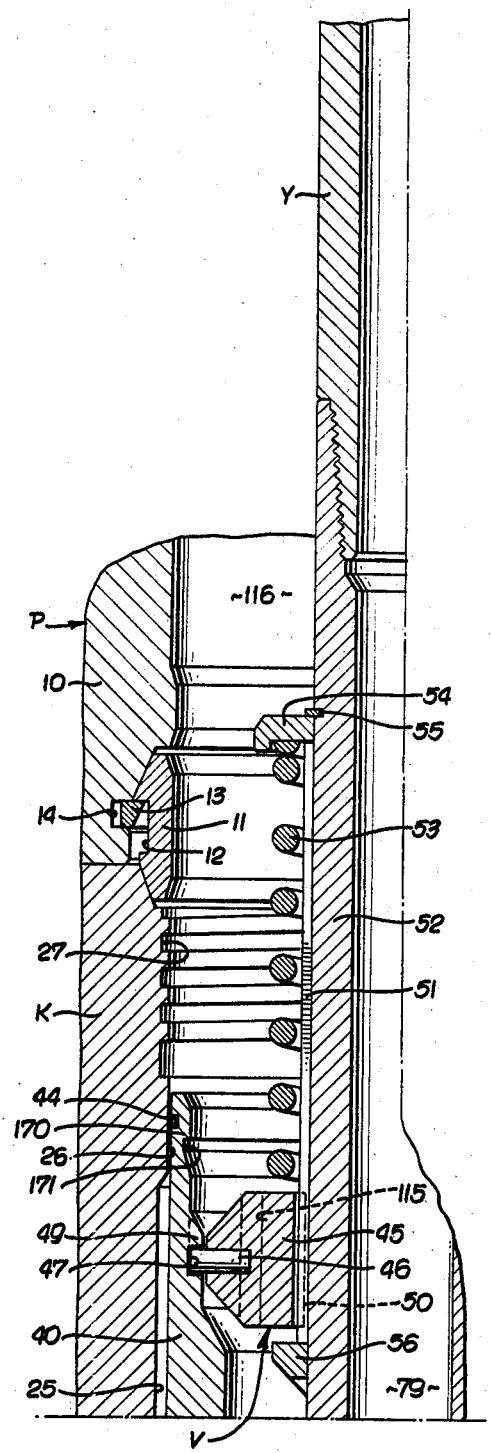
Figure 5B:
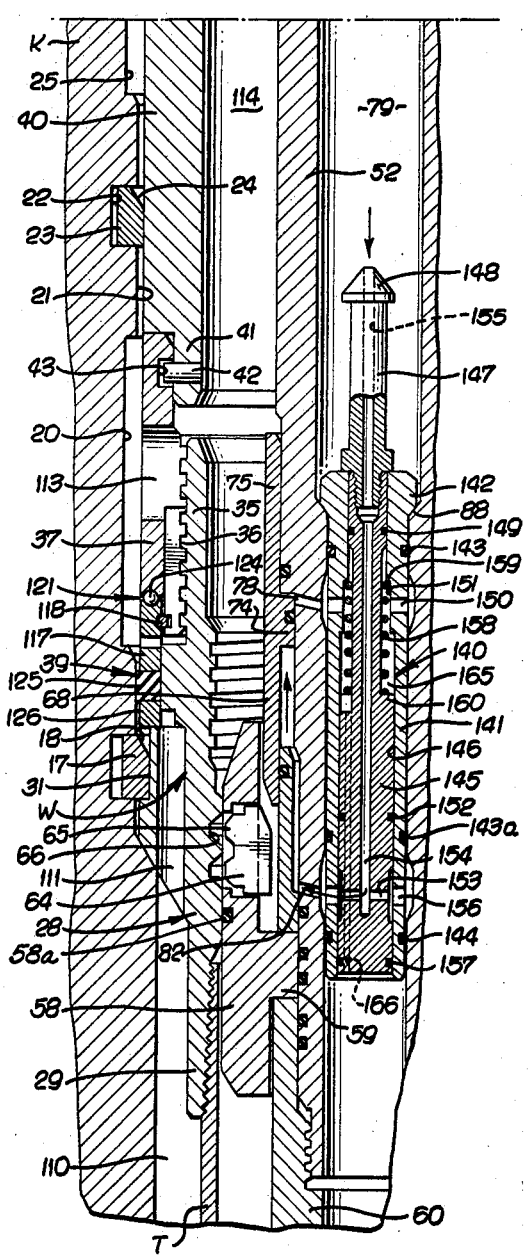
Figure 6:
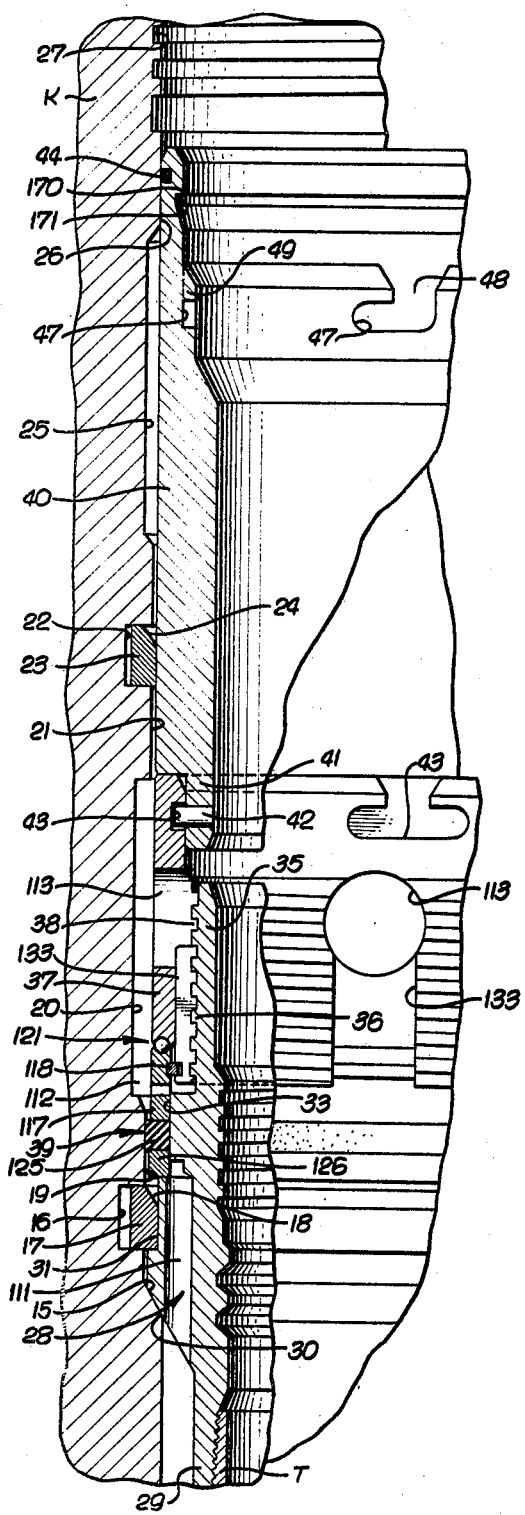
Figure 7:
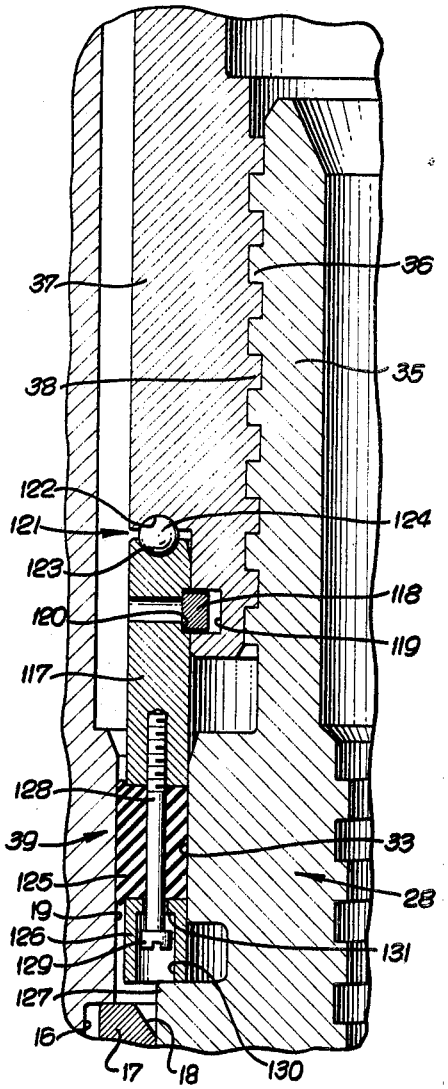

FIGS. 5a and 5b together constitute views corresponding to FIGS 2a and 2b, with the casing hanger locked in packed-off condition in the surrounding well device, FIG. 5b being a lower continuation of FIG. 5a;

FIG. 6 is a section through the apparatus, parts being broken away, illustrating the casing hanger apparatus and a seat protector thereabove installed in a casing hanger body therearound, and with the running tool removed;

FIG. 7 is an enlarged fragmentary, longitudinal section through the packer portion of the apparatus disclosed in FIG. 5b and FIG. 6, in sealed off condition between the inner and outer casing hanger bodies;

FIG. 8 is a quarter longitudinal section through a portion of the apparatus, illustrating the hydraulic coupling of the running tool to the hanger apparatus surrounding it;

FIG. 9 is a cross-section taken along the line 9—9 on FIG. 2b;

FIG. 10 is a cross-section taken along the line 10—10 on FIG. 2b.

Figure 1:
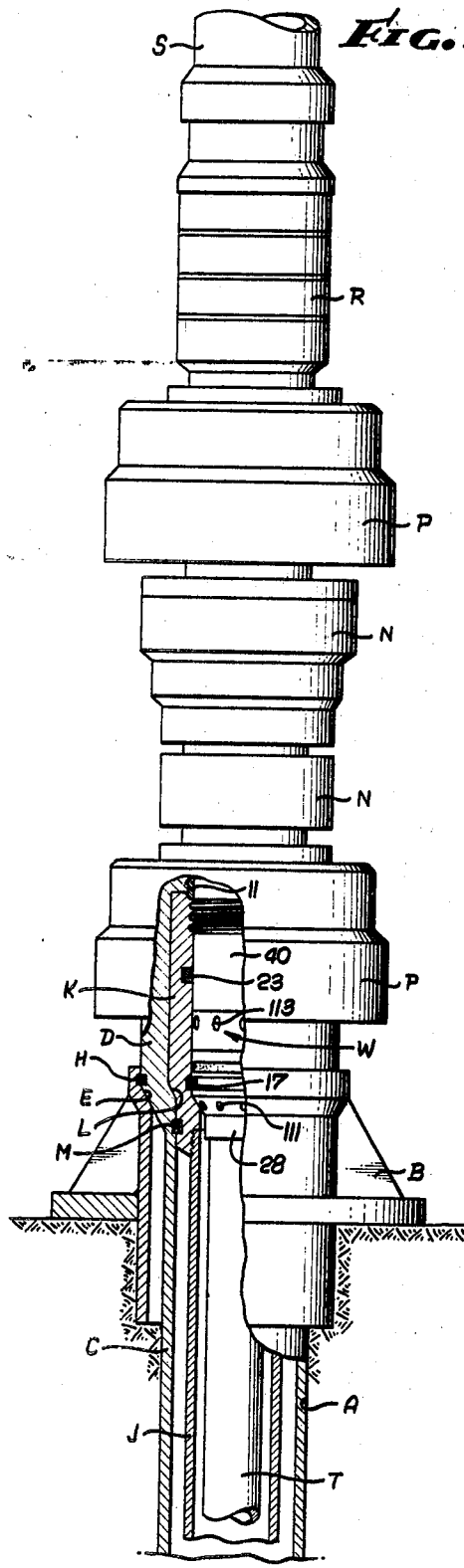
Figure 3:
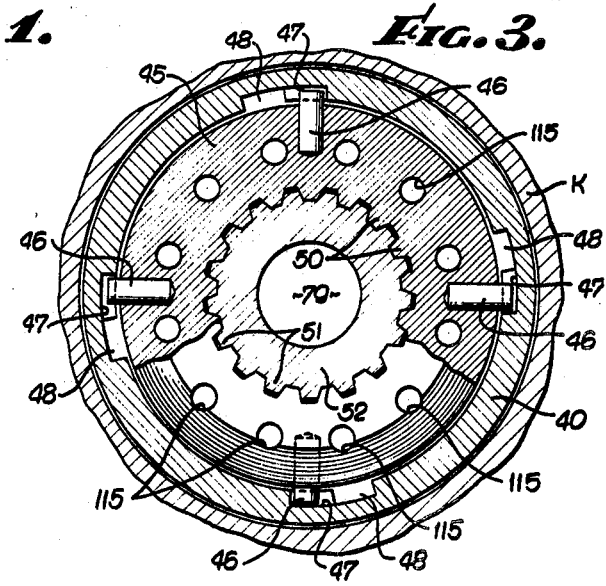
Figure 4:
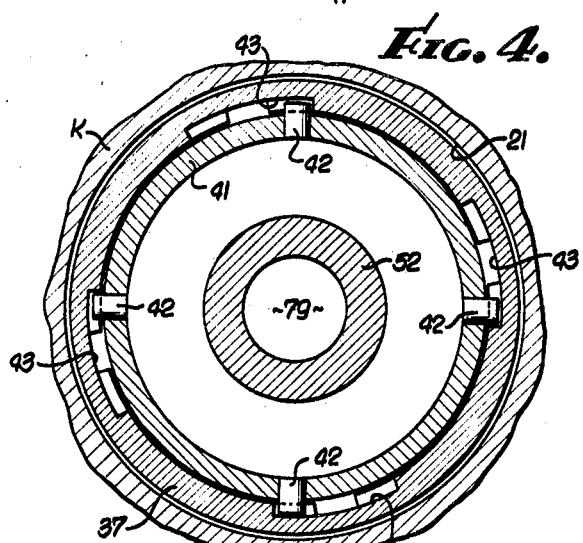
FIG. 4 is a cross-section taken along the line 4—4 on FIG. 2b.

A typical installation of apparatus embodying the invention is illustrated somewhat diagrammatically in FIG. 1, in connection with a well bore A underlying an ocean or other body of water and extending downwardly from the ocean floor F. A suitable base structure B is supported on the ocean floor and carries an outer casing C of relatively large diameter suspended from a casing hanger body D resting upon an outer seat E on the base and locked thereto by a suitable lock ring H. Disposed within the outer casing is an intermediate string of casing J extending down into the well bore and suspended from a suitable casing hanger body K resting upon a companion tapered seat L in the outer body and suitably locked thereto by a lock ring M. One or a stack of blowout preventers N are connected by a suitable connector P, such as a hydraulic connector illustrated in my application Ser. No. 476,417, filed Aug. 2, 1965, for "Coupling Apparatus for Well Heads and the Like," now Patent No. 3,321,217, to the hanger body D, these blowout preventers being connected by a suitable hydraulic or other connector P to a flexible joint R, made of sections, secured to a marine conductor pipe S extending to the drilling rig (not shown), which may be located on a drilling platform (not shown), or on a floating vessel or structure. An inner string of casing T is disclosed in FIG. 1 as having been locked in packed-off condition in the intermediate hanger body K, and it is in connection with the casing hanger apparatus W for this inner casing to which the present invention is particularly directed.

As disclosed in the drawings, the casing hanger assembly W is connected to a running tool V, the upper end of which is connected to a suitable tubular running string Y, such as drill pipe, extending through the blowout preventers N, connectors P, flexible joint R and marine conductor pipe S to the drilling rig. As shown in FIGS. 2a and 2b, the hydraulic connector P, which is actually secured to the outer casing hanger body K in the manner illustrated in the above-identified application Ser. No. 476,417, includes an adapter 10 above the hanger bodies, the inner end of the adapter clamping a suitable seal ring 11 between it and the upper end of the intermediate hanger body K, this seal ring having a groove 12 receiving a seal ring retainer 13 mounted in an internal circumferential groove 14 in the coupling adapter. The intermediate hanger body K has a lower downwardly tapering seat or shoulder 15 above which is located an internal circumferential ring groove 16 containing a split inherently contractable lock ring 17 having an upper inner beveled surface 18. Above the lock ring groove is an internal seal surface 19 of cylindrical form, and above this seal surface is an enlarged internal bore 20 which terminates at another internal cylindrical surface 21, which may be of the same diameter as the first-mentioned seal surface. Another internal circumferential groove 22 opens through this last-mentioned cylindrical surface and contains a split inherently contractable lock ring 23 having an upper inner beveled surface 24. Above the cylindrical surface 21, the outer hanger body has another enlarged bore 25, and above this enlarged bore, the body K has another internal cylindrical surface 26 above which is provided a suitable internal thread 27 in the hanger body.

The casing hanger apparatus W includes a body 28 having a lower threaded portion 29 connected to the casing T suspended therebelow. This body has a downwardly facing tapered seat 30 adapted to engage the upwardly facing seat 15 in the surrounding hanger body K. Above this seat is a reduced external diameter portion 31 providing an upwardly facing shoulder 32 engageable with the lower end of the lock ring 17 when the hanger body 28 is moving past the lock ring, during which time the latter is expanded outwardly within its internal groove 16, then contracting partially inwardly across the shoulder 32 so as to lock the hanger body in place by preventing its upward movement from the shoulder 15.

Above the lock shoulder is a reduced diameter, external, cylindrical seal surface 33 which will be disposed opposite the internal seal surface 19 of the surrounding hanger body, and in spaced relation thereto, to provide an annular passage 34 when the hanger body comes to rest upon its companion seat. Above this seal surface 33, the hanger body has a reduced external diameter portion 35 provided with the right-hand thread 36 to which is adjustably and threadedly secured a packer actuating sleeve 37 having an internal thread 38 meshing with the right-hand thread. This packer actuator sleeve supports and will also exert and axial force against a pack-off assembly 39 so as to shorten the latter and compress it between the opposed sealing surfaces 19, 33, as described hereinbelow.

The actuator sleeve 37 is connected to a seat protector 40 thereabove, which has a reduced diameter portion 41 piloted within the sleeve. The seat protector has a plurality of circumferentially spaced radial torque pins 42 extending into inverted T-shaped slots 43 in the sleeve 37. The seat protector 40 carries an external seal ring 44 at its upper portion, which is adapted to seal against the internal cylindrical surface 26 of the surrounding hanger body K, as described hereinbelow, and this seat protector is connected to a torque ring 45, forming part of the running and actuating tool V, by means of a plurality of circumferentially spaced coupling pins 46 on the ring disposed within companion J-slots 47 in the seat protector. The vertical legs 48 (FIG. 6) of the J-slots open upwardly through an upwardly facing shoulder 49 of the seat protector, the torque ring 45 having internal splines 50 adapted to mesh with external splines 51 on the running tool mandrel 52, the upper end of which is threadedly secured to the tubular running string Y, such as drill pipe, extending to the drilling rig above the body of water. A helical compression spring 53 surrounds the mandrel, its upper end bearing against a spring seat 54, which, in turn, bears against a retainer ring 55 suitably secured to the mandrel, and its lower end bearing against the upper end of the torque ring 45 and tending to urge the torque ring in a downward direction along the mandrel, limited by engagement of the ring with a lower stop ring 56 suitably secured to the mandrel.

The mandrel 52 is releasably connected to the hanger body 28 by a hydraulically operated device 57. As disclosed most particularly in FIGS. 2b, 5b and 8, the hydraulically operable connection includes a body 58 surrounding the lower portion of the mandrel 52 and having an inwardly directed flange 59 clamped between the upper end of a drill pipe joint 60 threadedly secured to the lower end of the mandrel, and a lower piston sleeve 61 above the flange, the upper end of which is engageable with a downwardly facing mandrel shoulder 62. The body 58 has a plurality of circumferentially spaced openings or slots 63 in which are disposed latches, locking segments or dogs 64 that have outer tapered fingers or lugs 65 adapted to fit within companion circumferential internal grooves 66 in the casing hanger body 28. An annular expander and retainer cylinder 67 surrounds the running tool mandrel 52 and has a lower cylinder sleeve portion 68 adapted to move within the annular space 69 between the body 58 and the lower piston sleeve 61 to a position behind the locking segments 64, in order to hold them outwardly with their fingers 65 within the hanger body grooves 66. The lower sleeve 68 has a tapered nose 70 adapted to engage companion tapered surfaces 71 in the upper portion of the dogs or segments 64 for the purpose of shifting such segments outwardly into the grooves 66, the extent of outward movement of the segments being limited by engagement of their upper and lower terminals 72 with the upper and lower stop portions 73 provided on the body on opposite sides of its slots 63.

The lower sleeve 68 merges into a cylinder head 74 slidable along the periphery of the mandrel 52, and this cylinder head, in turn, merges into an upper cylinder sleeve 75 slidable along an enlarged diameter piston portion 76 of the mandrel, which conforms in external diameter to that of the lower piston sleeve 61. The cylinder 67 is shiftable hydraulically along the mandrel 52 and within the body 58 surrounding it between a lower position illustrated in FIGS. 2b and 8, in which the lower cylinder sleeve 68 is disposed behind the segments 64, to maintain them locked within the internal grooves 66 of the casing hanger body, and an upper position (FIG. 5b) in which the lower cylinder sleeve 68 is disposed above the lock segments 64, permitting them to retract inwardly and fully from the internal body grooves 66 so as to effect a disconnection between the mandrel 52 and the hanger body 28.

The longitudinal shifting of the cylinder 67 along the mandrel 52 and with respect to the body 58 is accomplished hydraulically. Thus, fluid can flow through upper ports 78 extending from the central mandrel passage 79 into an annular cylinder space 80 between the cylinder head 74 and an upper piston head 81 provided by the mandrel for the purpose of shifting the cylinder 57 in a downward direction along the mandrel. The annular cylinder member 57 is shifted in an upward direction by fluid passing from the central passage 79 in the mandrel through a plurality of lower ports 82 into a cylinder space 83 provided between the lower piston sleeve 61 and the periphery of the mandrel 52 for action upon the lower surface of the cylinder head 74, urging the cylinder head upwardly to a position in which the cylinder head engages the lower piston head 81, as disclosed in FIG. 5b, in which the dogs 64 are permitted to be freed from the grooves 66.

The running tool V is connected to the hanger body 28 and the parts of the apparatus disposed therearound, the pack-off assembly 39 being in its initial retracted condition and with the packing actuator sleeve 37 in its upper threaded position on the casing hanger body. The seat protector 40 is connected to the upper portion of the packing actuator sleeve 37 by locating the torque pins 42 in the T-slots 43 and the seat protector is connected to the torque ring 45 by reception of the torque pins 46 of the latter within the J-slots 47. At the drilling rig, the running tool V is lowered into the hanger body 28 until the locking dogs 64 are opposite the circumferential grooves 66, at which time the dogs are retracted and the cylinder sleeve 67 is disposed in its upper position along the mandrel 52. A dart or plug 85 (FIG. 8) is then lowered into the mandrel passage 79 for the purpose of directing fluid under pressure from the mandrel passage through the upper ports 78 into the upper cylinder space 80. As disclosed, this dart includes an outer body 86 having an upper head 87 adapted to seat upon an upwardly facing shoulder 88 in the mandrel. This body carries a suitable side seal ring 89 adapted to seal against the wall of the mandrel passage between the upper and lower sets of ports 78, 82, the body having a plurality of external longitudinal grooves 90 through which fluid under pressure can pass to the upper mandrel ports 78. The dart or plug also includes a central valve stem 91 disposed within the body 86 and having a fishing head 92 projecting above the upper end of the latter. This stem is sealed against the wall of the body passage 93 by a seal ring 94 and is urged in a downward direction by a helical compression spring 95 surrounding the lower portion of the stem, with its upper end bearing against a downwardly facing body shoulder 96 and its lower end bearing against a spider 97 forming the upper end of a cap 98 threaded on the lower end of the stem. The spider 97 constitutes a flange resting upon the upper end of a stem retainer 99 threaded into the lower end of the body 86 and which has a central passage 100 therethrough. This stem retainer 99 and the body portion surrounding it are smaller in diameter than the diameter through the mandrel passage, providing an annular space 101 through which fluid from the lower cylinder space 83 and the lower ports 82 can pass into the mandrel passage therebelow.

With the body head 87 engaging its seat 88, it is evident that fluid under pressure can pass through the external grooves 90 in the upper portion of the body and through the upper body ports 78 to shift the cylinder 67 and its sleeve 68 downwardly behind the dogs 64, moving them outwardly to place their fingers or lugs 65 fully into the circumferential lock grooves 66 in the casing hanger body 28, the sleeve 68 remaining behind the dogs and holding them locked within the body grooves. By means of a suitable fishing tool (not shown), the head 92 can be grasped and moved upwardly to retrieve the dart or plug 85 from the mandrel passage.

It will be evident from the drawings that leakage of fluid under pressure between the various parts to which it is applied is prevented by a suitable seal ring 102 on the piston head 74 engaging the periphery of the mandrel 52, by an upper seal ring 103 on the mandrel slidably engaging the inner surface of the upper sleeve 75, by an external seal ring 104 on the lower piston sleeve 61 engaging the inner surface of the lower cylinder sleeve 68 and by a seal ring 105 on the mandrel below the lower ports 82 engaging the inner surface of the lower piston sleeve 61. The inwardly directed body flange 59 is sealed to the mandrel by seal rings 106 on the latter engaging the flange, leakage of fluid between the lower end of the mandrel and the drill pipe joint 60 therebelow being prevented by seal rings 107 on the mandrel engaging the inner surface of the drill pipe.

When the hanger apparatus W and the casing T suspended therefrom are connected to the running tool, as described above, and lowered through the marine conductor pipe S and the equipment connected thereto therebelow by means of the drill pipe Y to the position illustrated in FIGS. 2a and 2b, in which the hanger body 28 rests upon its seat 15 and the lock ring 17 has contracted over the upwardly facing shoulder 32, a by-pass circulating passage exists between the hanger apparatus and the surrounding hanger body K. As shown, this by-pass apparatus communicates with the annulus 110 in the well bore surrounding the suspended casing T and includes a plurality of circumferentially spaced longitudinal fluid passages 111 extending through the hanger body to the annular passage 34 between the opposed seal surfaces 19, 33. Fluid can then pass upwardly through the annular space 112 between the pack-off assembly 39 and the enlarged bore 20 of the external casing hanger, and thence inwardly through a plurality of fluid by-pass holes 113 formed through the upper portion of the actuator sleeve 37 to the interior of the latter, then passing upwardly through an annular passage 114 between the seat protector and the mandrel, the by-pass path then communicating through holes 115 in the torque ring 45 with the annulus 116 between the mandrel 52 and the tubular running string Y thereabove and the surrounding apparatus extending to the drilling rig.

The packing assembly 39 includes an upper abutment ring 117 secured to the lower portion of the threaded packing actuator sleeve 37 by means of a swivel. Such swivel includes a split snap retainer ring 118 mounted in an external groove 119 in the nut or sleeve 37 and an internal groove 120 in the upper abutment ring 117. A thrust bearing 121 is provided between the actuator sleeve 37 and the upper abutment ring 117 so that the sleeve can be rotated without rotating the ring. As shown, the thrust bearing includes an upper race 122 in the threaded sleeve and a lower race 123 in the upper end of the upper abutment ring, ball bearings 124 being disposed in these races so as to allow the sleeve 37 to rotate without rotating the upper abutment ring 117 or transmitting torque thereto.

The lower end of the upper abutment ring 117 engages an initially retracted packing element ring 125 made of an elastomer material, such as rubber or rubber-like material, the lower end of this packing ring being engaged by a lower abutment 126 which is adapted to engage an upwardly facing shoulder 127 on the hanger body 28 below its external seal surface 33. The packing ring 125 and the lower abutment 126 are assembled to the upper abutment ring 117 by a plurality of cap screws 128 extending through the lower ring and packer ring and threaded into the upper abutment ring, the screws having heads 129 received within counterbores 130 in the lower abutment ring and adapted to engage the upper ends 131 of the counterbores.

Prior to lowering the casing apparatus and the casing suspended therefrom into the well bore, the casing hanger apparatus W has its parts in their relative positions illustrated in FIGS. 2a and 2b in which the packing element or ring 125 is retracted and with the actuator sleeve 37 occupying its upper threaded position on the hanger body 28, the actuator sleeve being connected to the seat protector 40 by the pin and T-slot connections 42, 43 and the seat protector being connected to the torque ring 45 through the pin and J-slot connections 46, 47. The lower portion of the mandrel 52 is then secured to the hanger body 28 by means of the hydraulically actuatable connection 57 in the manner described above, a seal ring 58a on the body 58 sealing against the hanger body 28.

The casing T is lowered from the drilling rig through the equipment disposed above the ocean floor and into the well bore A, the uppermost portion of the casing string then being secured to the hanger apparatus W, which has its parts in the relative relationship illustrated in FIGS. 2a and 2b, this combination then being lowered by the running string Y. The tapered shoulder 30 of the hanger body 28 will move past the upper lock ring 23 and shift it outwardly out of its way and will then move downwardly into engagement with the lower lock ring 17, expanding it into its groove 16 out of its way until the hanger body engages its companion seat 15 in the surrounding hanger body K, whereupon the lock ring 17 contracts across the body shoulder 32 and locks the hanger body 28 and the casing T suspended therebelow in place. At this time, the seat protector 40 or actuator sleeve 37 is disposed across the upper lock ring 23 and the seal ring 44 on the seat protector is out of sealing relation to its companion seal surface 26 at the upper portion of the outer hanger body K. An upward pull can now be taken on the running string Y to insure the hanger body 28 is locked in place. Circulating fluid can now be pumped down through the tubular running string Y and through the apparatus, continuing on down through the casing T and then passing around its lower end or suitable casing ports (not shown) into the annulus 110 between the suspended casing string and the well bore, and also between the casing string and whatever casing string J is surrounding it above the open well bore. The circulating fluid flows upwardly through the body passages 111 and through the annular passage 34 between the internal and external seal surfaces 19, 33, flowing upwardly around the packing assembly 39 and also upwardly between the packing assembly 39 and the threaded portion 35 of the hanger body, continuing upwardly through internal grooves 133 in the actuator sleeve to a position above the hanger body. Fluid will also pass from the annular space 112 externally of the packing assembly through the by-pass holes 113 in the sleeve 37, then combining with the fluid passing upwardly through the internal grooves 133 for upward movement through the annular passage 114 between the seat protector 40 and mandrel 52, as well as through the torque ring holes 115, continuing upwardly through the annulus 116 around the mandrel 52 and the running string Y to the drilling rig.

The circulating fluid can be followed by the pumping of a suitable charge of cement slurry down through the running string Y and the suspended casing string T. This charge of cement then moves upwardly through the annulus 110 around the casing string T to the desired height, in a known manner, the fluid in advance of the charge of cement slurry passing upwardly through the by-pass path through and around the casing hanger apparatus W.

After the cement has been displaced around the casing, the running string Y and the mandrel 52 are rotated, the rotation of the mandrel being transferred through the ring 45 and the pins 46 to the seat protector 40 and from the seat protector pins 42 to the packer actuator sleeve 37 to thread the latter in a downward direction along the casing hanger body 28, and thereby move the packing assembly 39 downwardly along the body 28 and the surrounding hanger body K until the lower abutment 126 engages the body shoulder 127, at which time the retracted packing sleeve 125 is disposed between the internal and external seal surfaces 19, 33. A continuation of the rotation of the running string Y and mandrel 52 will effect a continued downward shifting of the actuator sleeve 37 along the body, moving the upper abutment 117 toward the lower abutment 126 and shortening the packing sleeve or ring 125 and expanding it outwardly and inwardly into firm sealing engagement with the internal and external sealing surfaces 19, 33 on the outer and inner hanger bodies K, 28. A sufficient torque is imposed on the apparatus to insure the firm sealing of the packing sleeve 125 against its companion surfaces. However, it is to be noted that during the entire rotation of the actuator sleeve 37 on the hanger body, the torque is not transmitted to the packing structure so that no twist is imparted to the latter, but only an axial compressive force in effecting its pack-off against the inner seal surface 19 and the external seal surface 33.

The effectiveness of the packed-off seal can now be tested with all of the apparatus remaining in place. A suitable pressure is imposed on the fluid in the annulus 116 surrounding the tubular running string Y, as, for example, by closing a blowout preventer N thereagainst and then subjecting the fluid in the annulus below the blowout preventer to adequate pressure. If no pressure loss occurs, assurance is had that the seal is effective. If a leak is detected, which is determined to be due to the packing 125, an additional compression of the packing sleeve can be undertaken by turning the running string Y and the mandrel 52, which will effect an additional downward threading of the actuator sleeve 37 along the packer body 28.

After the cement has been displaced around the suspended casing and the seal tested, the running string Y and the mandrel 52 are disconnected from the hanger body, such disconnection being effected hydraulically. As disclosed in FIG. 5b, another dart or plug 140 is lowered down through the running string Y and into the mandrel passage 79, this plug including a body 141 having an upper head 142 which will come to rest upon the upwardly facing seat 88 in the mandrel. When the head engages the seat, an upper side seal ring 143 on the body sealingly engages the wall of the mandrel passage above the upper ports 78, an intermediate seal ring 143a on the body engages the wall of the mandrel passage between the upper and lower ports 78, 82, and a lower seal ring 144 on the body engages the wall of the mandrel passage below the lower ports 82. A stem 145 is disposed within the central passage 146 through the plug body 141, this stem including an upper portion 147 having an upper fishing head 148 which is threadedly secured to the main stem portion therebelow. An upper seal ring 149 on the stem engages the wall of the body bore above a plurality of upper ports 150 extending from the central passage 151 of the body to its exterior, communicating with the upper mandrel ports 78. An intermediate seal ring 152 is disposed on the stem and sealingly engages the wall of the body bore 146 above a set of lower ports 153 in the stem, extending from a central passage 154 running upwardly through the stem and communicating with a central passage 155 in the upper stem portion 147 that is open at its upper end, the stem ports 153 communicating with side ports 156 extending through the body 141 and communicating with the mandrel ports 82. A lower seal ring 157 is mounted on the lower portion of the stem and sealingly engages the wall of the body passage below the stem ports 153. A helical spring 158 surrounds a reduced diameter portion of the stem, its upper end bearing against a body shoulder 159 and its lower end against a stem shoulder 160, urging the stem in a downward position illustrated in FIG. 5b.

When the dart 140 is disposed in the position shown in FIG. 5b, fluid pumped down the running string Y and into the mandrel 52 can flow through the stem passages 155, 154 and out through the ports 153, 156 of the dart and through the mandrel ports 82 into the lower annular space 83 between the lower piston 61 and the mandrel 52, the fluid under pressure acting in an upward direction on the cylinder head 74 and shifting the annular cylinder 67 upwardly along the mandrel 52 to a position in which the locking dogs or latches 64 are free to shift inwardly from the hanger body grooves 66. The fluid or liquid in the cylinder space 80 above the head 74 can pass outwardly through the upper mandrel ports 78 and body ports 159 into the annular spring space 165, then continuing downwardly through a discharge passage 166 extending through the stem, the exhausting fluid flowing out of the lower end of the stem 145 and into the mandrel passage 79 below the dart 140.

The running tool V can now be disconnected from the seat protector 40 by partially turning the running string Y to the right to be assured that the torque ring pins 46 are disposed against the ends of the J-slot 47 and in alignment with its vertical legs 48, whereupon the tubular running string Y is moved upwardly to move the pins out of the J-slots 47, which permits the running tool V to be removed from the casing hanger apparatus W and elevated through the equipment thereabove to the drilling rig, the parts remaining behind them being in the position illustrated in FIG. 6, with the seat protector 40 in place and with an effective pack-off existing between the hanger body 28 and the hanger body K or other device therearound. At this time, it is to be noted that the downward movement of the seat protector 40 will have shifted its seal ring 44 into sealing engagement with the cylindrical surface 26 at the upper portion of the surrounding hanger body K.

When the seat protector 40 is no longer required, it is easily removed by lowering a suitable retrieving tool on a running string. This retrieving apparatus may be of the type disclosed in my application for "Well Bore Running-In and Retrieving Tool," Ser. No. 503,563, filed Oct. 23, 1965, now Patent No. 3,350,130. This tool becomes coupled to the seat protector 40, as by latching under a downwardly facing shoulder 170 of an internal groove 171 in the upper portion of the seat protector, with suitable pins entering the J-slots 47 so as to transmit torque to the seat protector 40. The retrieving tool (not shown) can then be apropriately turned by turning the running string Y to turn the seat protector relative to the packing actuator sleeve 37 and align the torque pins 42 with the vertical legs of the inverted T-slots 43, which will then allow an upward pull to be taken on the apparatus to shift the pins 42 from the T-slot 43, and thereby effect a full disconnection of the seat protector 40 from the actuator sleeve 37, the seat protector then being withdrawn with the running string Y to the drilling rig above the body of water.

In the event that a leakproof seal is not effected between the packing ring 125 and the inner and outer hanger bodies 28, K, the packer assembly 39 can be removed. A retrieving tool (not shown) is connected to a tubular string Y and lowered from the drilling rig, the retrieving tool having pins corresponding to the torque pins 42 of the seat protector. These pins will move into the T-slots 43, whereupon the running string Y and retrieving tool are rotated to the left to unthread the entire packer assembly and its sleeve 37 upwardly of the body 28 and completely disconnect the actuator sleeve from the body. The packer assembly can be elevated to the drilling rig and a new pack-off assembly substituted in its place, to which a seat protector 40 is connected, which are then run through the equipment above the floor of the ocean and threadedly connected to the hanger body 28, continued right-hand rotation of the running string, running tool, seat protector, and the packer actuating sleeve 37 again shifting the latter downwardly and effecting a pack-off against the internal and external sealing surfaces 19, 33, the packer assembly 39 then being in the condition illustrated in FIGS. 5b and 7.

Following removal of the seat protector 40, the upper lock ring 23 is then in position to lock another hanger body (not shown) from which another casing string is suspended, the hanger body resting upon the upper end of the hanger body 28 previously installed and having a shoulder that will be disposed below the lock ring 23 that will contract partially out of its internal groove 22 to overlie the shoulder of the hanger body, in essentially the same manner as the lower lock ring 17 overlies the shoulder 32 of the previously installed hanger body 28. A pack-off can be effected between a packing ring against the seal surface 21 above the upper lock ring 23 in essentially the same manner as with the packing assembly 39 described above, the groove 25 in the surrounding hanger body K affording by-pass area for circulating fluid that passes upwardly around the annulus between the subsequently run casing string (not shown) and the casing string T described above.

It is, accordingly, aparent that well bore casing hanger apparatus has been provided which requires only a single trip into the well bore to run, land, lock the hanger in place, test the lock, circulate fluid, pump cement for sealing and supporting the suspended casing in the drilled hole, actuate the annular seal, test the seal, and install the seat protector. All necessary apparatus is appropriately assembled at the drilling rig and is run simultaneously into the well bore. The packing element 125 is packed off by being subject to longitudinal compression only, there being no torque or twisting action imposed upon it. The hanger is locked in place before the cementing operation begins so that it cannot be pumped off its supporting seat. The effectiveness of the pack-off of the packing 125 can be tested before the running string Y is removed from the hole, and, if necessary, a defective pack-off can be remedied by retrieving the packing structure, in view of the ability to couple into the packing actuator sleeve 37 and reversely rotate and unthread it completely from the hanger body 28. The running string Y is released hydraulically, which eliminates the necessity for any substantial turning of the running string in order to retrieve the running tool V from the apparatus that is left connected to the casing hanger body 28, including the seat protector 40 for a hanger apparatus to be installed subsequently.

I claim:

1. In well bore casing apparatus: an outer body connectible to an outer casing; an inner body supportable by said outer body for suspending an inner casing within the outer casing; said inner and outer bodies providing a fluid passage therebetween communicating with the annular space between the inner and outer casings; a packing structure for closing said passage; a mandrel adapted for connection to a running string; first means releasably connecting said mandrel to said inner body; second means releasably connecting said packing structure to said mandrel; said inner body with the inner casing suspended therefrom and said packing structure being movable downwardly as a unit with said mandrel and running string to a position of support of said inner body on said outer body and with said packing structure in open relation to said passage; means for shifting said packing structure to a position closing said passage after support of said inner casing on said outer body; and hydraulically operable means for effecting release of said mandrel from said inner body, said hydraulically operable means comprising a first piston on said mandrel, a cylinder having a first skirt slidable along the exterior of said piston and retaining said first releasable connecting means in a position holding said mandrel connected to said inner body, said cylinder having a cylinder head slidable along said mandrel and projecting laterally inwardly across said piston, said mandrel having a port for feeding fluid under pressure from the interior of said mandrel into said cylinder between said head and piston to shift said cylinder along said mandrel and release said skirt from said first releasable connecting means.

2. In well bore casing apparatus for supporting a casing from an outer body previously installed at a well bore: an inner body for suspending the casing in the well bore; a mandrel adapted for connection to a running string; means releasably connecting said mandrel to said inner body, whereby said inner body and mandrel are movable downwardly by the running string to a position of support of said inner body on the outer body; and hydraulically operable means for effecting release of said mandrel from said inner body, said hydraulically operable means comprising a first piston on said mandrel, a cylinder having a first skirt slidable along the exterior of said piston and retaining said releasable connecting means in a position holding said mandrel connected to said inner body, said cylinder having a cylinder head slidable along said mandrel and projecting laterally inwardly across said piston, said mandrel having a port for feeding fluid under pressure from the interior of said mandrel into said cylinder between said head and piston to shift said cylinder along said mandrel and release said skirt from said releasable connecting means.

3. In well bore casing apparatus: an outer body connectible to an outer casing; an inner body supportable by said outer body for suspending an inner casing within the outer casing; said inner and outer bodies providing a fluid passage therebetween communicting with the annular space between the inner and outer casings; a packing structure for closing said passage; a mandrel adapted for connection to a running string; first means releasably connecting said mandrel to said inner body; second means releasably connecting said packing structure to said madrel; said inner body with the inner casing suspended therefrom and said packing structure being movable downwardly as a unit with said mandrel and running string to a position of support of said inner body on said outer body and with said packing structure in open relation to said passage; means for shifting said packing structure to a position closing said passage after support of said inner casing on said outer body; and hydraulically operable means for effecting release of said mandrel from said inner body, said hydraulically operable means comprising a first piston on said mandrel, a cylinder having a first skirt slidable along the exterior of said piston and retaining said first releasable connecting means in a position holding said mandrel connected to said inner body, said cylinder having a cylinder head slidable along said mandrel and projecting laterally inwardly across said piston, said mandrel having a port for feeding fluid under pressure from the interior of said mandrel into said cylinder between said head and piston to shift said cylinder along said mandrel and release said skirt from said first releasable connecting means; said first releasable connecting means comprising one or more latch members carried by said mandrel, a second piston on said mandrel, said cylinder having a second skirt slidable on the exterior of said second piston, said mandrel having another port for feeding fluid under pressure from the interior of said mandrel into said cylinder between said head and second piston to shift said cylinder along said mandrel and said first skirt along and behind said one or more latch members to shift and hold said one or more latch members connected to said inner body.

4. In well bore casing apparatus for supporting a casing from an outer body previously installed at a well bore: an inner body for suspending the casing in the well bore; a mandrel adapted for connection to a running string; means releasably connecting said mandrel to said inner body, whereby said inner body and mandrel are movable downwardly by the running string to a position of support of said inner body on the outer body; and hydraulically operable means for effecting release of said mandrel from said inner body, said hydraulically operable means comprising a first piston on said mandrel, a cylinder having a first skirt slidable along the exterior of said piston and retaining said releasable connecting means in a position holding said mandrel connected to said inner body, said cylinder having a cylinder head slidable along said mandrel and projecting laterally inwardly across said piston, said mandrel having a port for feeding fluid under pressure from the interior of said mandrel into said cylinder between said head and piston to shift said cylinder along said mandrel and release said skirt from said releasable connecting means; said releasable connecting means comprising one or more latch members carried by said mandrel, a second piston on said mandrel, said cylinder having a second skirt slidable on the exterior of said second piston, said mandrel having another port for feeding fluid under pressure from the interior of said mandrel into said cylinder between said head and second piston to shift said cylinder along said mandrel and said first skirt along and behind said one or more latch members to shift and hold said one or more latch members connected to said inner body.

References Cited

UNITED STATES PATENTS

| | | | |
|---|---|---|---|
| 3,215,204 | 11/1965 | Sims | 285—306 X |
| 3,098,525 | 7/1963 | Haeber | 166—0.6 |
| 3,179,448 | 4/1965 | Jones | 285—146 |
| 3,273,646 | 9/1966 | Walker | 285—140 X |
| 3,279,539 | 10/1966 | Brown et al. | 285—142 X |
| 3,322,193 | 5/1967 | Word | 166—0.6 |
| 3,335,799 | 8/1967 | Miller | 285—18 X |

DAVID J. WILLIAMOWSKY, Primary Examiner

D. W. AROLA, Assistant Examiner

U.S. Cl. X.R.

285—83, 84, 141, 315, 348; 166—0.6